US010273008B2

United States Patent
Porter et al.

(10) Patent No.: US 10,273,008 B2
(45) Date of Patent: Apr. 30, 2019

(54) INERTIA REEL INTERFACE FOR STOWABLE SEATS

(71) Applicant: AMI Industries, Inc., Colorado Springs, CO (US)

(72) Inventors: Ryan Porter, Monument, CO (US); Dominic J. Maglia, Pueblo, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 243 days.

(21) Appl. No.: 15/469,038

(22) Filed: Mar. 24, 2017

(65) Prior Publication Data

US 2018/0273183 A1   Sep. 27, 2018

(51) Int. Cl.
*B60N 2/02*   (2006.01)
*B64D 11/06*   (2006.01)

(52) U.S. Cl.
CPC ........ *B64D 11/062* (2014.12); *B64D 11/0691* (2014.12)

(58) Field of Classification Search
CPC .. A47C 7/543; A47C 4/46; A47C 4/04; A47C 4/52; A47C 9/06; B64D 11/0691; B64D 11/0698; B64D 11/062; B64D 11/064; B60R 22/26; B60R 2022/1818; B60R 2022/3424; B60R 2022/3427; B60R 22/00; B60R 2/30; B60R 2/3018; B60R 2/3043; B60R 2/3047; B60R 2002/022
USPC .......... 297/378.1, 483, 216.1, 216.13, 452.2, 297/464, 473, 474, 475, 13, 14, 331, 380, 297/54, 42, 337; 244/122 R
See application file for complete search history.

(56) References Cited

U.S. PATENT DOCUMENTS

| | | | |
|---|---|---|---|
| 3,620,569 A | 11/1971 | Mathis | |
| 4,460,215 A | 7/1984 | Chamberlain et al. | |
| 4,993,666 A * | 2/1991 | Baymak | B09B 1/00 244/122 R |
| 5,934,760 A | 8/1999 | Schroth | |
| 6,152,401 A * | 11/2000 | Green | B60N 2/24 244/118.6 |
| 6,394,393 B1 * | 5/2002 | Mort | B64D 11/06 244/122 R |
| 6,409,243 B1 * | 6/2002 | Hansen | B60N 2/38 280/805 |
| 6,446,910 B1 | 9/2002 | Knoll et al. | |
| 6,585,190 B2 * | 7/2003 | Mort | B64D 11/06 244/122 R |

(Continued)

FOREIGN PATENT DOCUMENTS

GB   1121852   7/1968

OTHER PUBLICATIONS

European Patent Office, European Search Report dated Jul. 31, 2018 in Application No. 18163863.6-1010.

*Primary Examiner* — Chi Q Nguyen
(74) *Attorney, Agent, or Firm* — Snell & Wilmer, L.L.P.

(57) ABSTRACT

An inertia reel interface for stowable seats is provided. The inertia reel interface may allow for simple access and replacement of inertia reels during maintenance. The inertia reel interface may comprise an inertia reel beam, a payout tube, and one or more inertia reels coupled to the inertia reel beam. The inertia reel beam may deploy a shoulder harness webbing over the payout tube. The payout tube may pivot to a first access position or a second access position to allow for maintenance of the inertia reel interface components.

14 Claims, 7 Drawing Sheets

(56) References Cited

U.S. PATENT DOCUMENTS

| | | | |
|---|---|---|---|
| 6,666,520 B2 | 12/2003 | Murphy et al. | |
| 7,887,139 B2 * | 2/2011 | Yamada | B60N 2/22 |
| | | | 297/452.18 |
| 8,002,318 B2 * | 8/2011 | Saber | E01H 1/1206 |
| | | | 15/257.1 |
| 8,152,236 B1 * | 4/2012 | Romero | A47D 15/006 |
| | | | 297/16.1 |
| 8,419,127 B1 * | 4/2013 | Wilhelm | B60R 22/02 |
| | | | 280/808 |
| 9,033,412 B2 * | 5/2015 | Reinck | B60N 2/24 |
| | | | 244/122 R |
| 9,873,510 B2 * | 1/2018 | Ferguson | B64D 11/062 |
| 2010/0052401 A1 * | 3/2010 | Jessup | B60N 2/24 |
| | | | 297/471 |
| 2010/0301647 A1 * | 12/2010 | Carter | B60N 2/24 |
| | | | 297/216.1 |
| 2016/0023764 A1 | 1/2016 | Brandt et al. | |

* cited by examiner

INERTIA REEL INTERFACE FOR STOWABLE SEATS

FIELD

The present disclosure relates to aircrafts seats, and more specifically, to an inertia reel interface for stowable seats.

BACKGROUND

Aircraft cabin seats may be used for flight attendant safety and comfort during taxi, takeoff, landing, and inflight rest periods. Inertia reels may typically be mounted on a stationary structural beam located behind the cabin seat backrest. Shoulder harness webbing may be distributed from the inertia reels and exit near an upper portion of the cabin seat backrest. The shoulder harness webbing may be paid out through a web guide visible from the front of the seat. Inertia reels may be considered an aircraft maintenance item that should be accessible and replaceable in the field (e.g., onboard the aircraft). The stationary structural beam may be complex, heavy, and expensive, and may be difficult to remove and service in the field. Moreover, removing the web guides, threading the shoulder harness webbing through the web guides, and difficult access to the inertia reels and the stationary structural beam may inhibit replacement and/or servicing efficiency.

SUMMARY

In various embodiments, a stowable seat is disclosed. The stowable seat may comprise a housing and a backrest pivotally coupled to the housing. The backrest may be configured to pivot from a closed position into an open position. The stowable seat may comprise an inertia reel interface. The inertia reel interface may comprise an inertia reel beam coupled at a first end to a first inner surface of the housing and at a second end to a second inner surface of the housing. The inertia reel interface may comprise a payout tube coupled at a third end to the first inner surface of the housing and at a fourth end to the second inner surface of the housing. The inertia reel interface may comprise an inertia reel coupled to the inertia reel beam. The inertia reel may be configured to deploy a shoulder harness webbing over the payout tube and the backrest.

In various embodiments, the stowable seat may further comprise a web separator coupled to an outer surface of the payout tube. The stowable seat may also comprise a headrest coupled to an upper portion of the housing, wherein a bottom of the headrest is in contact with the web separator such that the shoulder harness webbing may slide between the outer surface of the payout tube and the bottom of the headrest. In various embodiments, the third end of the payout tube may be pivotally coupled to the first inner surface of the housing such that the payout tube may pivot at the third end relative to the housing in response to the fourth end of the payout tube being decoupled from the second inner surface of the housing. In various embodiments, the fourth end of the payout tube may be pivotally coupled to the second inner surface of the housing such that the payout tube may pivot at the fourth end relative to the housing in response to the third end of the payout tube being decoupled from the first inner surface of the housing. In various embodiments, the payout tube may comprise an extruded aluminum tubing. The stowable seat may further comprise at least one of a first outer web separator or a second outer web separator coupled to an outer surface of the payout tube. In various embodiments, the inertia reel may be coupled to the inertia reel beam with a mechanical fastener. The mechanical fastener may couple the inertia reel to the inertia reel beam through a shoulder bushing. In various embodiments, the payout tube may comprise a cylindrical shape.

In various embodiments, an inertia reel interface is disclosed. The inertia reel interface may comprise an inertia reel beam, a payout tube, and an inertia reel coupled to the inertia reel beam. The inertia reel may be configured to deploy a shoulder harness webbing over the inertia reel beam.

In various embodiments, the inertia reel interface may further comprise a web separator coupled to an outer surface of the payout tube. The payout tube may comprise an extruded aluminum tubing. The inertia reel interface may further comprise at least one of a first outer web separator or a second outer web separator coupled to an outer surface of the payout tube. The inertia reel may be coupled to the inertia reel beam with a screw. The screw may couple the inertia reel to the inertia reel beam through a shoulder bushing. The payout tube may be configured to pivot into at least one of a first access position or a second access position. The payout tube may comprise a cylindrical shape.

In various embodiments, a method of operating a stowable seat is disclosed. The method may comprise pivoting a payout tube into a first access position or a second access position. The method may comprise removing a shoulder harness webbing from the payout tube. In response to the payout tube being in the first access position the shoulder harness webbing may be removed from a fourth end of the payout tube. In response to the payout tube being in the second access position the shoulder harness webbing may be removed from a third end of the payout tube.

In various embodiments, the method may further comprise pivoting a backrest into an open positon. In response to the backrest being in the open position, an inertia reel interface may be exposed. The method may also comprise decoupling an inertia reel from an inertia reel beam in the inertia reel interface. In various embodiments, in the first access position, the third end of the payout tube may be pivotally coupled to a first inner surface of a housing, and in the second access position the fourth end of the payout tube may be pivotally coupled to a second inner surface of the housing.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. An X-Y-Z axis has been provided throughout the figures for ease of illustration.

Figure 1A:
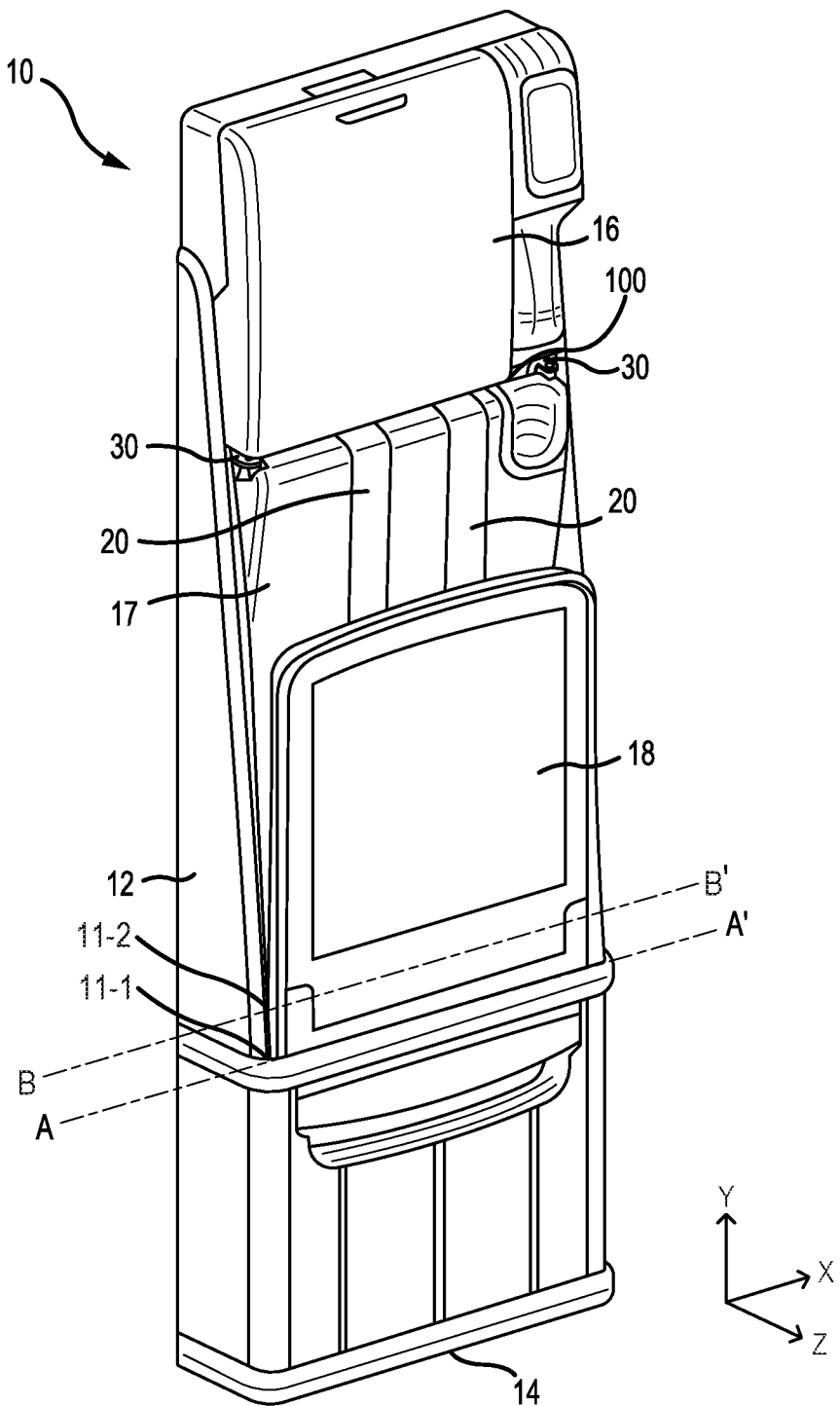
FIG. 1A illustrates a perspective view of a stowable seat in a stowed position, in accordance with various embodiments.
Figure 1B:
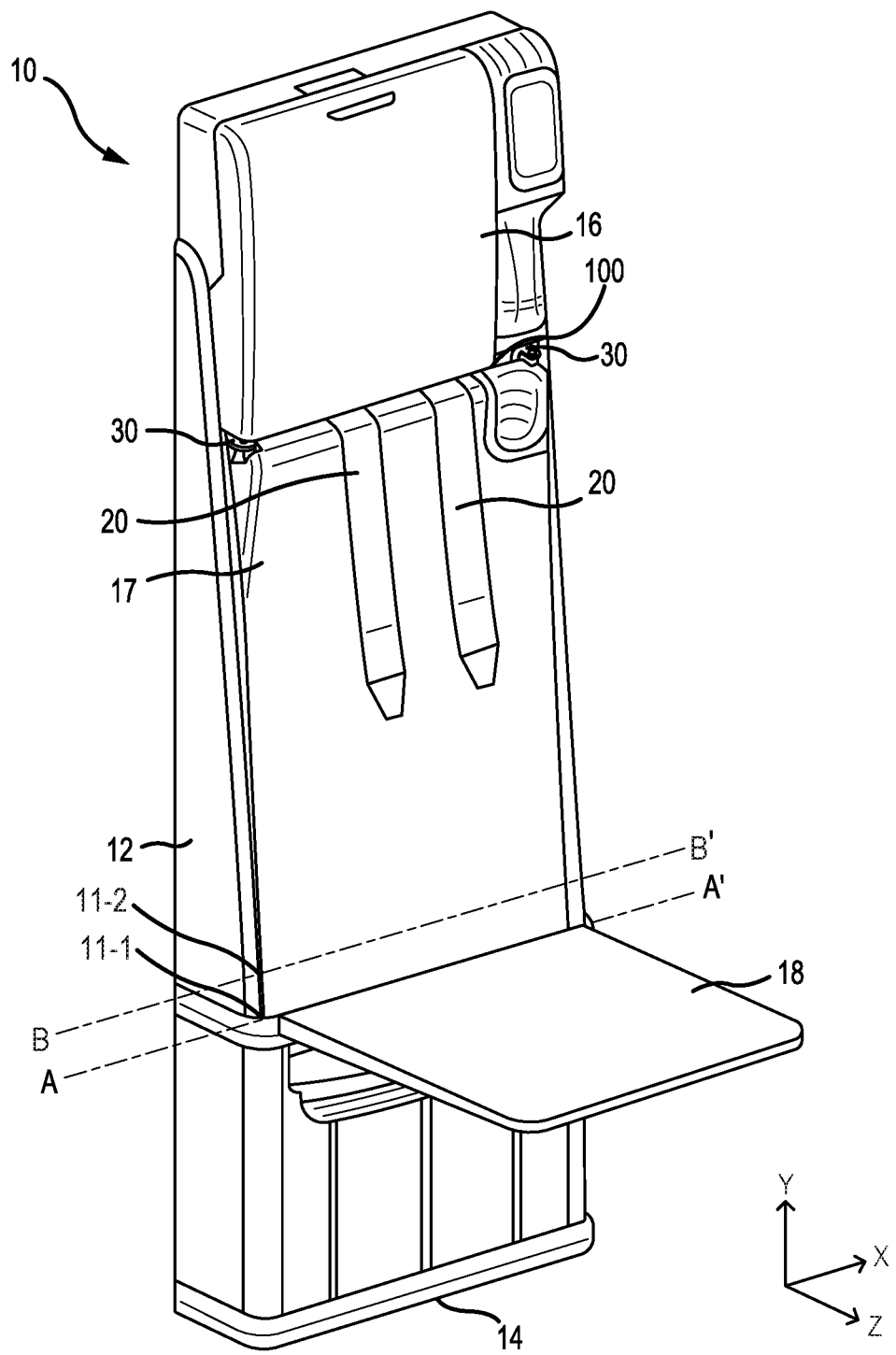
FIG. 1B illustrates a perspective view of a stowable seat with a seat pan in a deployed position, in accordance with various embodiments.
Figure 1C:
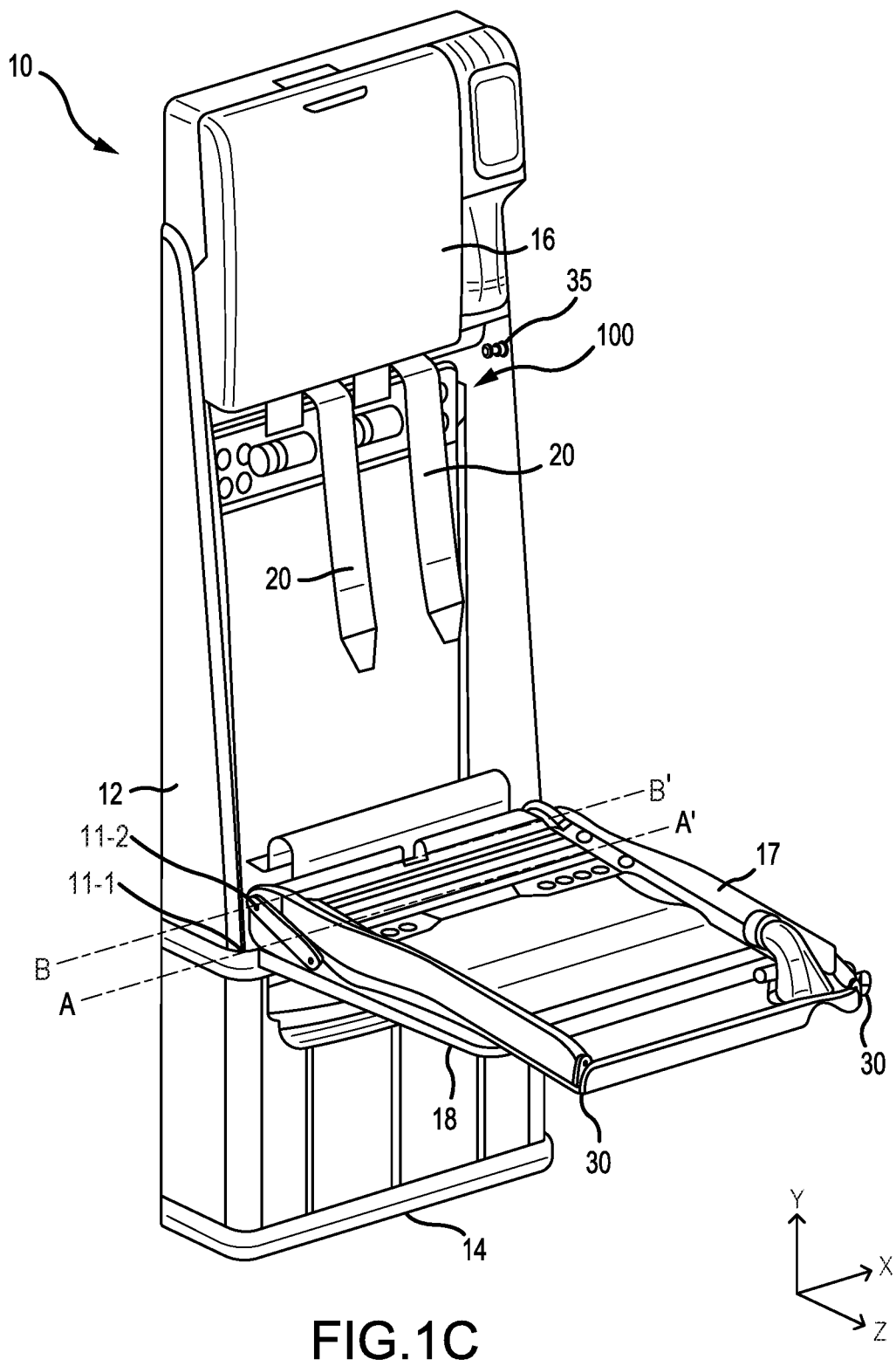
FIG. 1C illustrates a perspective view of a stowable seat with a backrest in an open position, in accordance with various embodiments.

In various embodiments, and with reference to FIGS. 1A, 1B, and 1C, a stowable seat 10 is disclosed. Stowable seat 10 may be a cabin attendant seat, and/or the like, and may be located on an aircraft. Stowable seat 10 may comprise a housing 12, a base 14, a headrest 16, a seat pan 18, and a backrest 17. With reference to FIG. 1A, stowable seat 10 is depicted in a stowed position with backrest 17 and seat pan 18 at least partially stored within housing 12. Housing 12 may provide structural support to stowable seat 10. Housing 12 may comprise any suitable type of material capable of providing structural support, such as, for example, machined aluminum. Housing 12 may also be reinforced to provide additional structural support, such as, for example, through the use of aluminum side spars. Base 14 may be coupled to the bottom of housing 12, and may extend along the Y-axis away from housing 12. Base 14 may also provide a mounting point to mount stowable seat 10 to a surface, such as, for example, an aircraft floor. For example, base 14 may comprise a plurality of feet, and/or the like, configured to couple stowable seat 10 to the surface.

In various embodiments, seat pan 18 may be pivotally coupled to housing 12. Seat pan 18 may pivot in a direction towards housing 12 into a stowed position, and in a direction away from housing 12 into a deployed position. In this regard, seat pan 18 may pivot into a position proximate backrest 17 while in the stowed position. Stowable seat 10 in the stowed position may occupy less volumetric space than stowable seat 10 in the deployed position. Stowable seat 10 may be stowed to conserve useable volume in an aircraft and/or other application where volumetric space may be limited. With reference to FIG. 1B, seat pan 18 of stowable seat 10 is depicted in the deployed position. In this regard, seat pan 18 may be configured to pivot in a direction away from housing 12 to a deployed position substantially perpendicular with housing 12. For example, seat pan 18 may pivot along an axis A-A' relative to a seat pivot point 11-1. Seat pan 18 may comprise any suitable type of seat. For example, seat pan 18 may comprise a bench seat, a bucket seat, a cushioned seat, and/or the like.

In various embodiments, headrest 16 may be coupled to an upper portion of housing 12 in a location proximate backrest 17, and may extend along the Y-axis away from housing 12. Headrest 16 may be configured to provide support to the head of a passenger, attendant, and/or the like sitting on stowable seat 10 while in the deployed position. Headrest 16 may comprise any suitable type of head rest. For example, headrest 16 may comprise a substantially flat surface. Headrest 16 may also comprise a cushioned material.

In various embodiments, a shoulder harness webbing 20 may be configured to secure a passenger seated in stowable seat 10. Shoulder harness webbing 20 may comprise any suitable type of seat belt or restraint system and/or mechanism. Shoulder harness webbing 20 may be deployed from an inertia reel interface 100, as discussed further herein, and may be deployed at a position between backrest 17 and headrest 16. Shoulder harness webbing 20 may be configured to couple to a seat belt and/or the like to further secure a passenger seated in stowable seat 10. For example, shoulder harness webbing 20 may be configured to attach to a female safety attachment member, such as restraint buckle and/or the like, located on a seat belt from seat pan 18.

In various embodiments, backrest 17 may be configured to provide support to the back of a passenger, attendant, and/or the like sitting on stowable seat 10 while seat pan 18 is in the deployed position. In that respect, backrest 17 may comprise a contoured surface, a cushioned surface, and/or the like to provide additional comfort. Backrest 17 may also comprise a polycarbonate coating. For example, backrest 17 may comprise a polycarbonate coating where shoulder harness webbing 20 deploys and/or contacts backrest 17 to at least partially reduce damage to backrest 17 caused by shoulder harness webbing 20 rubbing against backrest 17. Backrest 17 may couple to housing 12 at a first position proximate to headrest 16 and at a second position proximate to seat pan 18. Backrest 17 may be pivotally coupled to housing 12 at the second position such that backrest 17 may pivot in a direction towards housing 12 into a closed position, and in a direction away from housing 12 into an open position. In that respect, backrest 17 may pivot into a position substantially parallel with housing 12 in the closed position (e.g., to allow a passenger to sit in stowable seat 10 in the deployed position). With reference to FIG. 1C, backrest 17 is depicted in the open position. Backrest 17 may pivot in a direction away from housing 12 into a position substantially perpendicular with housing 12 in the open position. For example, backrest 17 may pivot along an axis B-B' relative to a backrest pivot point 11-2, near seat pan 18. In the open position, inertia reel interface 100 may be exposed. In that respect, exposure of inertia reel interface 100 may allow for maintenance, replacement, and/or the like of various components of inertia reel interface 100, as discussed further herein.

In various embodiments, backrest 17 may comprise one or more access levers 30. Access levers 30 may be coupled to backrest 17 in any suitable location, such as, for example in the first position where backrest 17 couples to housing 12 and abuts headrest 16. Access levers 30 may be configured to aid in moving backrest 17 from the closed position into the open position. In that respect, each access lever 30 may be configured to lock backrest 17 in the closed position (e.g., to couple backrest 17 to housing 12 at the first position). For example, each access lever 30 may interface and/or engage with an access latch 35. Each access latch 35 may be coupled to an inner surface of the housing in a position corresponding to each access lever 30. In response to being engaged with access latch 35, access levers 30 may lock backrest 17 into the closed position (e.g., backrest 17 may be at least partially prevented from moving into the open position). In response to access lever 30 being pulled, access lever 30 may disengage from access latch 35 to allow backrest 17 to move into the open position.

Figure 2A:
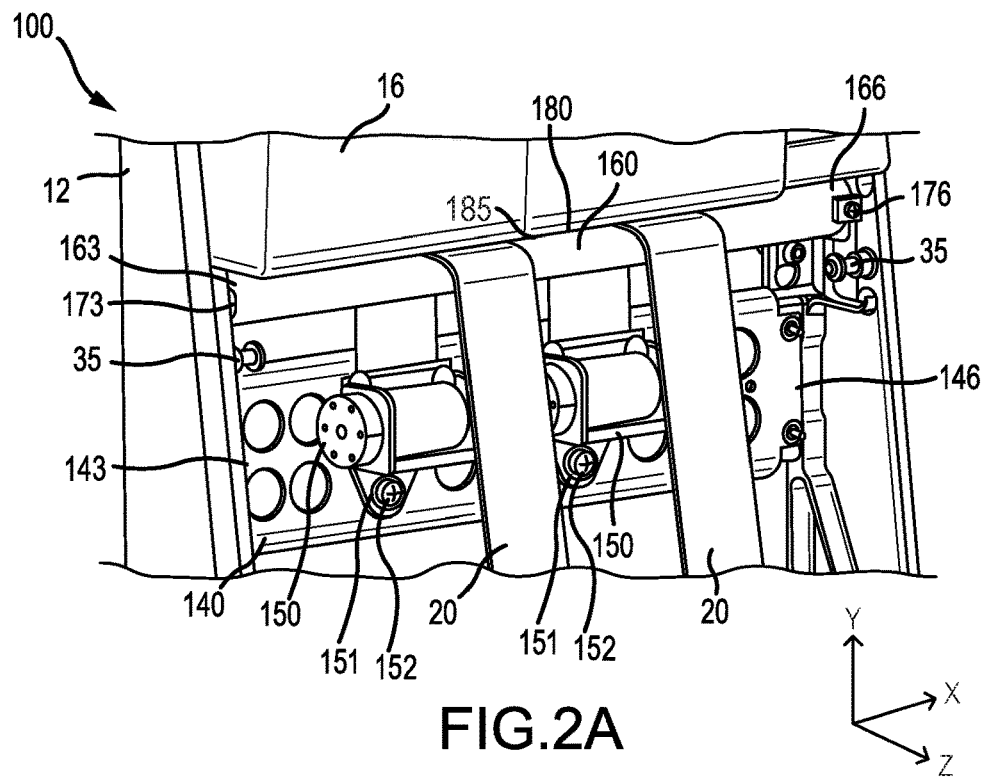
FIG. 2A illustrates a perspective view of an inertia reel interface, in accordance with various embodiments.
Figure 2B:
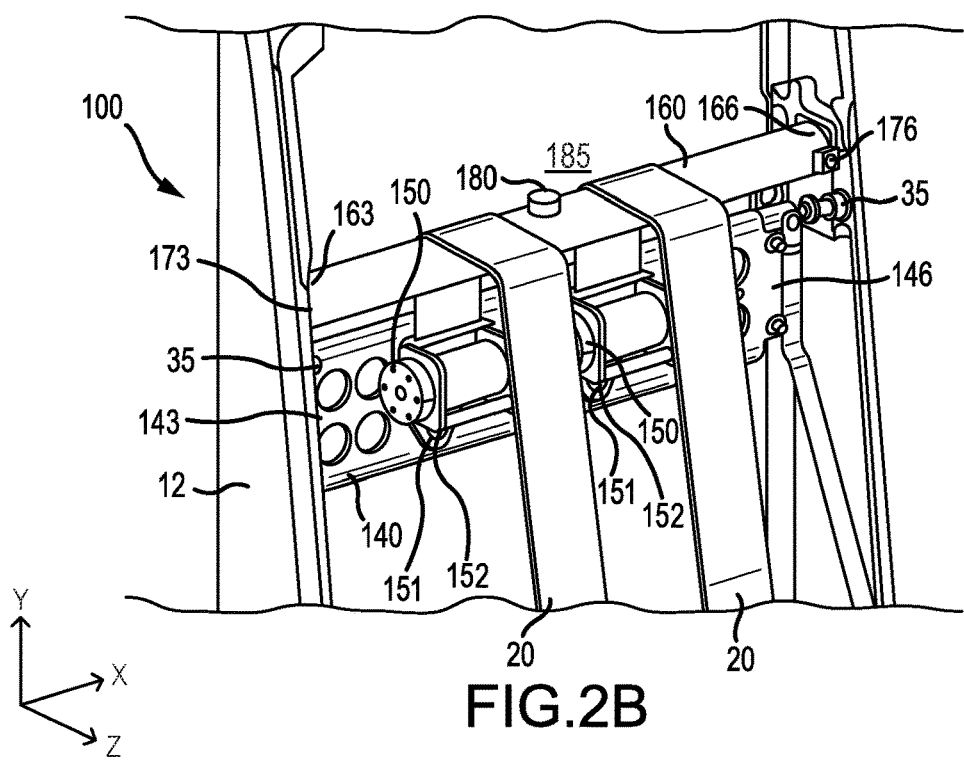
FIG. 2B illustrates a perspective view of an inertia reel interface having a web separator, in accordance with various embodiments.

In various embodiments and with reference to FIGS. 2A and 2B, inertia reel interface 100 is depicted in greater detail. Inertia reel interface 100 may be at least partially located within housing 12, as discussed further herein. Inertia reel interface 100 may allow for simple and convenient access to harness components (e.g., inertia reels 150, shoulder harness webbing 20, etc.). In that respect, inertia reel interface 100 may allow for easy and efficient replacement of harness components during maintenance and/or other such similar events. Inertia reel interface 100 may also allow for the deployment of shoulder harness webbing 20 without a separate web guide, thus at least partially reducing the potential for web jamming caused by threading shoulder harness webbing 20 through a web guide, or the pulling of shoulder harness webbing 20 at an angle from the web guide. In various embodiments, inertia reel interface 100 may comprise an inertia reel beam 140, a payout tube 160, and/or one or more inertia reels 150.

In various embodiments, inertia reel beam 140 may be at least partially disposed within housing 12. Inertia reel beam 140 may comprise a first end 143 opposite a second end 146. First end 143 may be coupled to an inner surface of housing 12 (e.g., a first inner surface of housing 12), and second end 146 may be coupled to an opposite inner surface of housing 12 (e.g., a second inner surface of housing 12). Inertia reel beam 140 may be coupled to housing 12 via screws and/or any other suitable means of attachment. Inertia reel beam 140 may comprise any suitable type of material capable of providing structural support, such as, for example, machined aluminum, and/or the like. In various embodiments, inertia reel beam 140 may be machined and/or manufactured (e.g., via investment casting, additive manufacturing, and/or the like) to remove material to improve the structural properties of inertia reel beam 140. Inertia reel beam 140 may also be reinforced to provide additional structural support, such as, for example, through the use of aluminum side spars.

In various embodiments, one or more inertia reels 150 may be coupled to inertia reel beam 140. Inertia reels 150 may be configured to deploy and retract shoulder harness webbing 20. Each inertia reel 150 may deploy and/or retract shoulder harness webbing 20 over payout tube 160 and between backrest 17 and headrest 16. Inertia reels 150 may comprise an inertia locking mechanism, or other such similar apparatus and/or mechanism, to at least partially prevent shoulder harness webbing 20 from deploying further during a sudden acceleration or deceleration. Each inertia reel 150 may be coupled to inertia reel beam 140 using a mounting bracket, bolt, and/or the like. In various embodiments, each inertia reel 150 may be coupled to inertia reel beam 140 using a shoulder bushing 151 and a mechanical fastener 152 (e.g., a screw, bolt, etc.). In that respect, use of shoulder bushing 151 and mechanical fastener 152 may enable easy and convenient access for removal and/or installation of inertia reel 150 from inertia reel beam 140 (e.g., during maintenance and/or other similar replacement events). Use of shoulder bushing 151 may also enable inertia reel 150 to rotate about the Z-axis. As discussed further herein, rotation of inertia reel 150 may allow shoulder webbing 20 to slide on payout tube 160 (e.g., in response to a seated passenger moving in stowable seat 10, each inertia reel 150 may rotate to allow shoulder harness webbing 20 to slide along the X-axis on payout tube 160, to allow for comfortable passenger movement).

In various embodiments, payout tube 160 may be at least partially disposed with housing 12. For example, payout tube 160 may be disposed within housing 12 at a location above inertia reel beam 140 relative to the Y-axis. Payout tube 160 may comprise any suitable shape, such as, for example, a cylindrical shape. Payout tube 160 may be hollow or solid. Payout tube 160 may comprise an extruded aluminum material, and/or any other suitable material. Payout tube 160 may comprise a third end 163 opposite a fourth end 166. Third end 163 may be coupled to an inner surface of housing 12 (e.g., the first inner surface of housing 12), and fourth end 166 may be coupled to an opposite inner surface of housing 12 (e.g., the second inner surface of housing 12).

For example, and in various embodiments, third end 163 may be coupled to housing 12 at a first pivot coupling 173 and fourth end 166 may be coupled to housing 12 at a second pivot coupling 176. In response to decoupling third end 163 from first pivot coupling 173 or fourth end 166 from second pivot coupling 176, each pivot coupling 173, 176 may allow payout tube 160 to pivot relative to housing 12 to enable the placement and/or removal of shoulder harness webbing 20 over payout tube 160. In that regard, shoulder harness webbing 20 and/or the corresponding inertia reel 150 may be removed from either end of payout tube 160, thus allowing convenient removal regardless of the location of stowable seat 10 (e.g., the location of stowable seat 10 in an aircraft), and/or other such factors limiting volumetric space surrounding stowable seat 10. Third end 163 and/or fourth end 166 may be coupled to each corresponding pivot coupling 173, 176 via a screw, bolt, and/or any other suitable attachment mechanism.

Figure 3A:
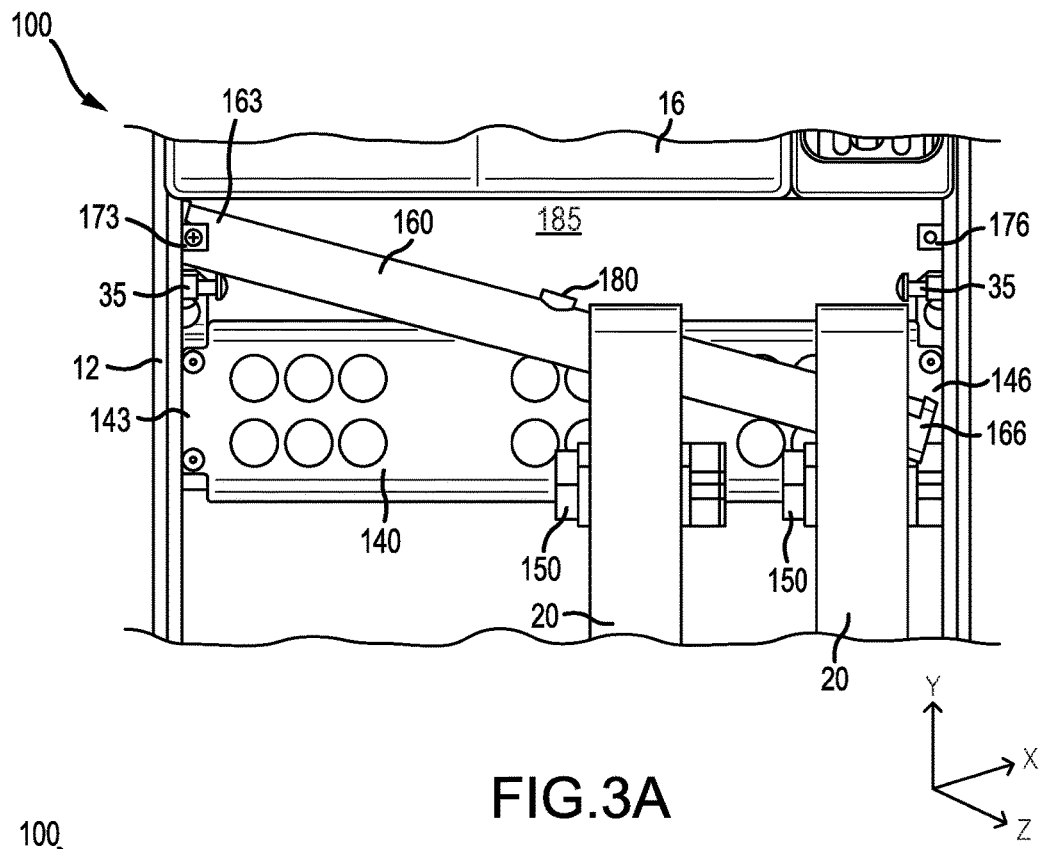
FIG. 3A illustrates a perspective view of an inertia reel interface having a payout tube in a first access position, in accordance with various embodiments.

In various embodiments, and with reference to FIG. 3A, payout tube 160 is depicted in a first access position. In the first access position, third end 163 may be coupled to first pivot coupling 173 and fourth end 166 may be decoupled from second pivot coupling 176. In that respect, in the first access position third end 163 may pivot relative to housing 12 to allow shoulder harness webbing 20 to be placed and/or removed from fourth end 166 of payout tube 160. As a further example, and with reference to FIG. 3B, payout tube 160 is depicted in a second access position. In the second access position, fourth end 166 may be coupled to second pivot coupling 176 and third end 163 may be decoupled from first pivot coupling 173. In that respect, in the second access position fourth end 166 may pivot relative to housing 12 to allow should harness webbing 20 to be placed and/or removed from third end 163 of payout tube 160.

In various embodiments, and with reference again to FIGS. 2A and 2B, payout tube 160 may also comprise a web separator 180. Web separator 180 may be coupled to an outer surface of payout tube 160, such as, for example, with a mechanical fastener, a rivet, welding, and/or the like. Payout tube 160 may also be manufactured to include web separator 180, such as, for example, through investment casting, additive manufacturing, and/or the like. Web separator 180 may be configured to create a gap 185 between payout tube 160 and headrest 16 to allow shoulder harness webbing 20 to deploy through gap 185. For example, a bottom portion of headrest 16 may contact web separator 180 to form gap 185 between the outer surface of payout tube 160 and the bottom portion of headrest 16. Gap 185 may comprise any suitable size suitable to enable shoulder harness webbing 20 to deploy onto backrest 17. Web separator 180 may also be configured to separate two or more shoulder harness webbings 20 deployed from two or more inertia reels 150. For example, wherein two inertia reels 150 are coupled to inertia reel beam 140, web separator 180 may be configured to separate each shoulder harness webbing 20 deployed from the two corresponding inertia reels 150. Web separator 180 may separate the shoulder harness webbings 20 to ensure proper deployment of each shoulder harness webbing 20, to ensure safety of the seated passenger, to allow each shoulder harness webbing 20 to slide on payout tube 160 (e.g., in response to the seated passenger moving in stowable seat 10, each shoulder harness webbing 20 may slide along the X-axis to allow for comfortable passenger movement), and/or to at least partially prevent entangling of each shoulder harness webbing 20.

Figure 4:
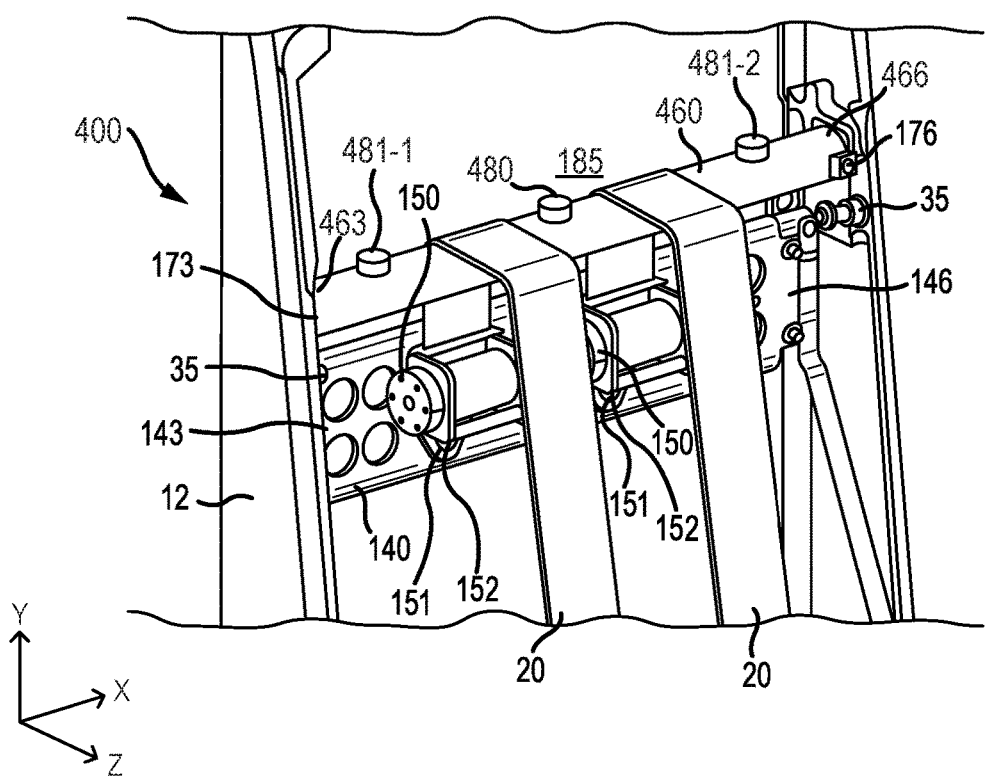
FIG. 4 illustrates a perspective view of an inertia reel interface having a payout tube comprising a first outer web separator and a second outer web separator, in accordance with various embodiments.

In various embodiments, and with reference to FIG. 4, an inertia reel interface 400 may also comprise a payout tube 460 having one or more outer web separators 481. For example, payout tube 460 may comprise a first outer web separator 481-1 and/or a second outer web separator 481-2. Each outer web separator 481 may be similar to web separator 480. For example, each outer web separator 481 may be coupled to an outer surface of payout tube 460, such as, for example, with a mechanical fastener, a rivet, welding, and/or the like. Payout tube 460 may also be manufactured to include each outer web separator 481, such as, for example, through investment casting, additive manufacturing, and/or the like. Each outer web separator 481 may be configured to at least partially limit shoulder harness webbing 20 from contacting the inner surfaces of housing 12 (e.g., to at least partially limit movement of shoulder harness webbing 20 along the X-axis in a direction away from web separator 480). For example, first outer web separator 481-1 may be located on payout tube 460 at a location between web separator 480 and third end 463. Second outer web separator 481-2 may be located on payout tube 460 at a location between web separator 480 and fourth end 466.

Figure 5:
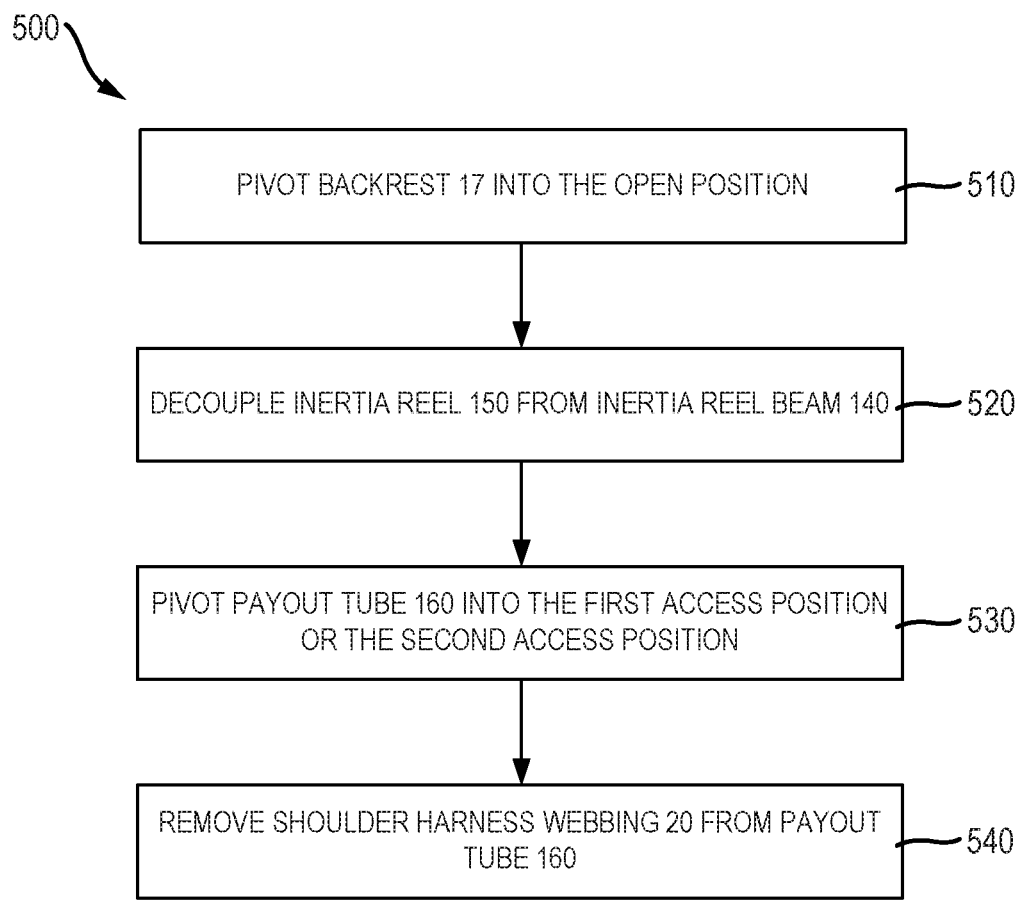
FIG. 5 illustrates a method of operating a stowable seat, in accordance with various embodiments.

In various embodiments, and with reference to FIG. 5, a method 500 of operating stowable seat 10 is disclosed. Method 500 may allow for maintenance, addition, or removal of inertia reels 150 and/or any other component of inertia reel interface 100. In various embodiments, and with reference to FIGS. 5 and 1C, method 500 may comprise pivoting backrest 17 into the open position (Step 510). For example, access lever 30 may be pulled to release backrest 17 into the open position. In response to backrest 17 being in the open position, inertia reel interface 100 may be exposed.

Figure 3B:
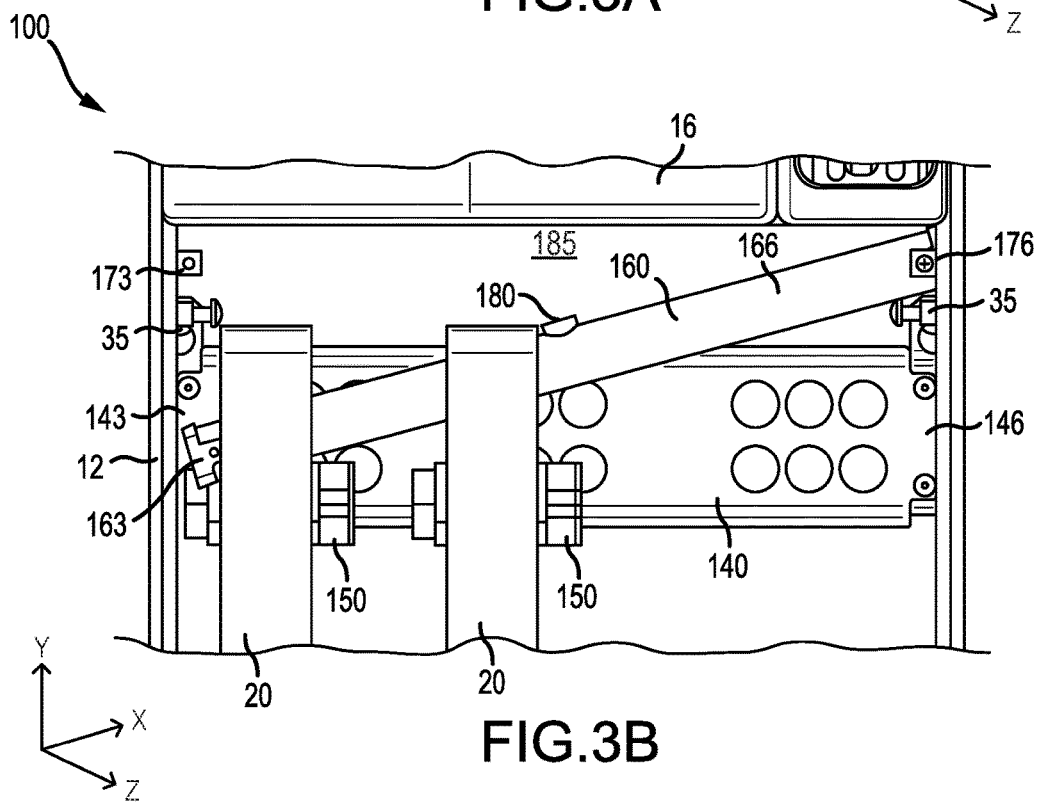
FIG. 3B illustrates a perspective view of an inertia reel interface having a payout tube in a second access position, in accordance with various embodiments.

With reference to FIGS. 5, 3A, and 3B, method 500 may comprise decoupling inertia reel 150 from inertia reel beam 140 (Step 520). For example, inertia reel 150 may be decoupled for maintenance of inertia reel 150 (e.g., removal of a defective inertia reel). Method 500 may comprise pivoting payout tube 160 into the first access position or the second access position (Step 530). In the first access position, third end 163 of payout tube 160 may be pivotally coupled to the first inner surface of housing 12 (e.g., at first pivot coupling 173), and fourth end 166 of payout tube 160 may be decoupled from the second inner surface of housing 12 (e.g., from second pivot coupling 176). In the second access position, fourth end 166 of payout tube 160 may be pivotally coupled to the second inner surface of housing 12 (e.g., at second pivot coupling 176), and third end 163 of payout tube 160 may be decoupled from the first inner surface of housing 12 (e.g., from first pivot coupling 173). Method 500 may comprise removing shoulder harness webbing 20 from payout tube 160 (Step 540). In response to payout tube 160 being in the first access position, shoulder harness webbing 20 may be removed from fourth end 166 of payout tube 160. In response to payout tube 160 being in the second access position, shoulder harness webbing 20 may be removed from third end 163 of payout tube 160. In response to inertia reel 150 being decoupled from inertia reel beam 140, inertia reel 150 may be removed with shoulder harness webbing 20.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A stowable seat, comprising:
    a housing;
    a backrest pivotally coupled to the housing, wherein the backrest is configured to pivot from a closed position into an open position; and
    an inertia reel interface, comprising:
        an inertia reel beam coupled at a first end to a first inner surface of the housing and at a second end to a second inner surface of the housing;
        a payout tube coupled at a third end to the first inner surface of the housing and at a fourth end to the second inner surface of the housing; and
        an inertia reel coupled to the inertia reel beam, wherein the inertia reel is configured to deploy a shoulder harness webbing over the payout tube and the backrest, wherein the inertia reel is coupled to the inertia reel beam with a mechanical fastener inserted through a shoulder bushing.

2. The stowable seat of claim 1, further comprising a web separator coupled to an outer surface of the payout tube.

3. The stowable seat of claim 2, further comprising a headrest coupled to an upper portion of the housing, wherein a bottom of the headrest is in contact with the web separator such that the shoulder harness webbing slides between the outer surface of the payout tube and the bottom of the headrest.

4. The stowable seat of claim 1, wherein the third end of the payout tube is pivotally coupled to the first inner surface of the housing such that the payout tube pivots at the third end relative to the housing in response to the fourth end of the payout tube being decoupled from the second inner surface of the housing.

5. The stowable seat of claim 1, wherein the fourth end of the payout tube is pivotally coupled to the second inner surface of the housing such that the payout tube pivots at the fourth end relative to the housing in response to the third end of the payout tube being decoupled from the first inner surface of the housing.

6. The stowable seat of claim 1, wherein the payout tube comprises an extruded aluminum tubing.

7. The stowable seat of claim 1, further comprising at least one of a first outer web separator or a second outer web separator coupled to an outer surface of the payout tube.

8. The stowable seat of claim 1, wherein the payout tube comprises a cylindrical shape.

9. An inertia reel interface, comprising:
    an inertia reel beam;
    a payout tube; and
    an inertia reel coupled to the inertia reel beam, wherein the inertia reel is configured to deploy a shoulder harness webbing over the payout tube, wherein a screw couples the inertia reel to the inertia reel beam through a shoulder bushing.

10. The inertia reel interface of claim 9, further comprising a web separator coupled to an outer surface of the payout tube.

11. The inertia reel interface of claim 9, wherein the payout tube comprises an extruded aluminum tubing.

12. The inertia reel interface of claim 9, further comprising at least one of a first outer web separator or a second outer web separator coupled to an outer surface of the payout tube.

13. The inertia reel interface of claim 9, wherein the payout tube is configured to pivot into at least one of a first access position or a second access position.

14. The inertia reel interface of claim 9, wherein the payout tube comprises a cylindrical shape.

* * * * *